No. 787,010. PATENTED APR. 11, 1905.
C. O. TINGLEY.
RUBBER PATCH.
APPLICATION FILED OCT. 5, 1904.
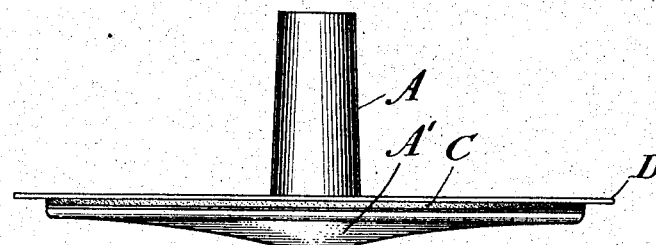
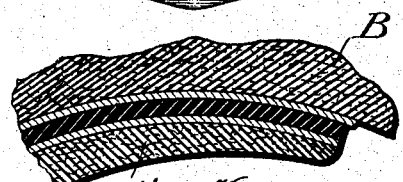
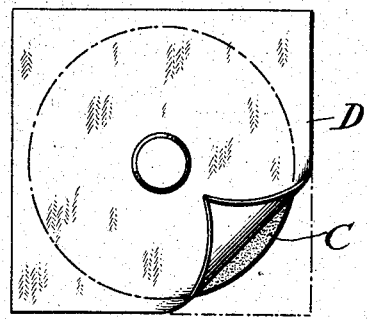
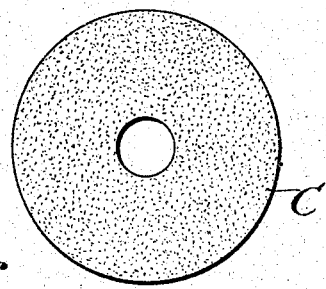
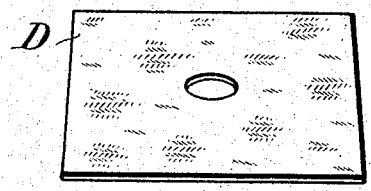
Witnesses
Inventor No. 787,010. Patented April 11, 1905.

UNITED STATES PATENT OFFICE.

CHARLES O. TINGLEY, OF RAHWAY, NEW JERSEY.

RUBBER PATCH.

SPECIFICATION forming part of Letters Patent No. 787,010, dated April 11, 1905.

Application filed October 5, 1904. Serial No. 227,260.

*To all whom it may concern:*

Be it known that I, CHARLES O. TINGLEY, a citizen of the United States, residing and doing business in Rahway, in the county of Union, in the State of New Jersey, have invented an Improvement Relating to Rubber Patches, of which the following is a specification.

The improvement will apply to patches for rubber-work of all kinds, but is intended more especially for patches for rubber tires for bicycles, automobiles, and analogous carriages of whatever name, and I will describe it as applied to repair a leak in such a tire, the usual step being taken to first cleanly punch out or otherwise remove a small quantity of the rubber around the leak, so as to produce a circular hole of a quarter-inch, more or less, in diameter.

I use, by preference, the form of plug set forth in the patent to me dated July 21, 1903, No. 734,108, and introduce it through the hole and allow it to spread its properly-shaped head in the interior of the tire and draw it out to a firm bearing against the interior of the tire around the hole in the same way as such plug and as other plugs for such purposes have been long used and approved, but with a very important difference in the preparation of the surface of the patch which applies against the tire and on the perfection of which the whole success of the patching depends. I make the main portion of the head and body of the plug of soft vulcanized rubber, as usual, but I reinforce the under face of the head—the whole surface, which is essential to adhere tightly—with a coating of raw or unvulcanized rubber. I have discovered that the now common failure of such patches can be made much less frequent—in fact, avoided entirely in all ordinary cases—by this reinforce. I am not certain as to the theory, but have by experiment established the fact.

If a vulcanized tire of any ordinary rubber composition be patched with a plug of similar or any ordinary quality, with any desired amount of any known rubber-cement interposed, the joint is liable to fail with severe use; but if either of the rubber faces which are thus brought together be first reinforced with a moderate thickness of raw rubber and after this has cooled and assumed the ordinary condition of raw or ordinary unvulcanized rubber both the interior of the tire and the under face of the patch or plug be coated with a fair amount of good rubber-cement the joint will be reliable. It is easier to coat or reinforce the patch than the tire. I carry out my invention by thus treating the patches and afterward proceeding in all respects as usual. I propose as a modification to reinforce also the interior of the tire.

The following is a description of what I consider the best means of carrying out the invention.

The accompanying drawings form a part of this specification.

Figure 1 is a side view of the plug complete. Fig. 2 is an end view corresponding to Fig. 1 seen from above. It is on a smaller scale. Fig. 3 is a corresponding view of the reinforce before its application to the other parts. Fig. 4 is a perspective view of the muslin protector. Fig. 5 is a cross-section of a small portion on a much larger scale, and Fig. 6 is an edge view of the invention applied to a patch as distinguished from a plug.

Similar letters of reference indicate corresponding parts in all the figures where they appear.

A is the body of the plug, and A' the head, while B is the tire. In the manufacture of the plug or at any convenient period afterward I apply a reinforce C in the form of a thin sheet of rubber unvulcanized. In my experiments I have used such sheets about one thirty-second of an inch thick, cut by dies a very little larger than the head A. I coat the under side of the head with rubber-cement having a little larger proportion than usual of naphtha and treat the parts at a low temperature, allow a little time during which it can dissolve a little of the adjacent vulcanized material, and then apply the unvulcanized annular reinforce, press it home, and hold it a moment. The unvulcanized material is more rapidly affected, and the perfect joining of these parts together is very certainly assured.

I have operated by hand, but propose to do all this, as also the adding of a protector of muslin D, by machinery in operating in the large way. The plugs are now ready for storing, transportation, and use. To use them, smear the exposed surface of the reinforce C as soon as practicable after peeling off the muslin and insert the plug skilfully in the same manner as the ordinary plug, draw it out by the body A to make a firm contact with the interior of the tire B, and finally cut off the surplus length of the body A, as usual. I prefer when convenient to coat with cement the interior of the tire adjacent to the hole and allow a little time to elapse before introducing and drawing home the plug; but this and also the conditions in regard to time allowed in effecting the junction of the reinforce with the head, the original consistency of the cement, &c., may be neglected without defeating the success of the invention.

I do not confine the invention to a patch in the form of a plug. Fig. 6 shows the invention applied to another ordinary form of patch.

I propose to manufacture the thin reinforcing material specially for this use and to make it all of pure Para rubber.

When my patches are made, as shown in Fig. 6, without any body A, they can be applied on the inside or on the outside of a tire the same as ordinary patches.

Parts of the invention can be used without others. I can apply the raw rubber in a hot condition, rolling or brushing it upon the vulcanized patch with or without a previous treatment of the latter with a cement. I prefer the complete formation of the reinforce at a previous and separate operation, as first described.

I claim as my invention—

1. As an article of manufacture a rubber patch of ordinary vulcanized material and a reinforce C of raw rubber and a protection D of easily-removable material adapted to serve substantially as herein specified.

2. As a patch for rubber tires and analogous articles of vulcanized rubber a plug A having a head B of vulcanized rubber, a reinforce C of raw rubber and a protection D of easily-removable material adapted to serve substantially as herein specified.

In testimony that I claim the invention above set forth I affix my signature in presence of two witnesses.

CHARLES O. TINGLEY.

Witnesses:
M. R. RAYNOR,
THOMAS DREW STETSON.